United States Patent [19]

Alonzo, Jr. et al.

[11] 4,397,497
[45] Aug. 9, 1983

[54] EXPANDABLE CAMPER BODY

[76] Inventors: George J. Alonzo, Jr.; George J. Alonzo, Sr., both of 304 Athania Pkwy., Metairie, La. 70001

[21] Appl. No.: 193,034

[22] Filed: Oct. 2, 1980

[51] Int. Cl.³ .............................................. B62D 33/08
[52] U.S. Cl. ....................................... 296/26; 296/100
[58] Field of Search .............. 296/26, 165, 100, 216, 296/156

[56] References Cited

U.S. PATENT DOCUMENTS

| 2,457,581 | 12/1948 | McCain | 296/26 X |
| 2,555,942 | 6/1951 | Supplee | 296/27 |
| 2,853,340 | 9/1958 | Hershberger | 296/168 |
| 2,971,794 | 2/1961 | Garcia | 296/26 |
| 2,995,398 | 8/1961 | Davenport | 296/26 |
| 3,124,386 | 3/1964 | Jonas | 296/176 |
| 3,165,762 | 1/1965 | Hage | 296/216 X |
| 3,463,540 | 8/1969 | Carr | 296/161 |
| 3,578,378 | 5/1971 | Anderson | 296/100 |
| 3,640,565 | 2/1972 | Anderson | 296/100 |
| 3,850,470 | 11/1974 | Trelle | 296/23 C |
| 4,068,886 | 1/1978 | Gostomski | 296/100 |
| 4,133,571 | 1/1979 | Fillios | 296/23 |
| 4,252,363 | 2/1981 | Rodrigue | 296/100 |
| 4,289,346 | 9/1981 | Bourgeois | 296/100 X |

*Primary Examiner*—Joseph Paul Brust
*Attorney, Agent, or Firm*—Morris Sussman

[57] ABSTRACT

An expandable camper body for use in a pick-up truck, consisting of two units, a front unit fastened to the side rails and truck body and a back unit movable so that when fully extended overlaps the truck's tailgate so as to provide a full size camper, the back unit being designed to telescope into the front unit, the upper tail gate locks to the sides and the lower tail gate swings down and locks to the truck's flatbed so as to provide a camper and/or a pick-up truck as desired.

9 Claims, 19 Drawing Figures

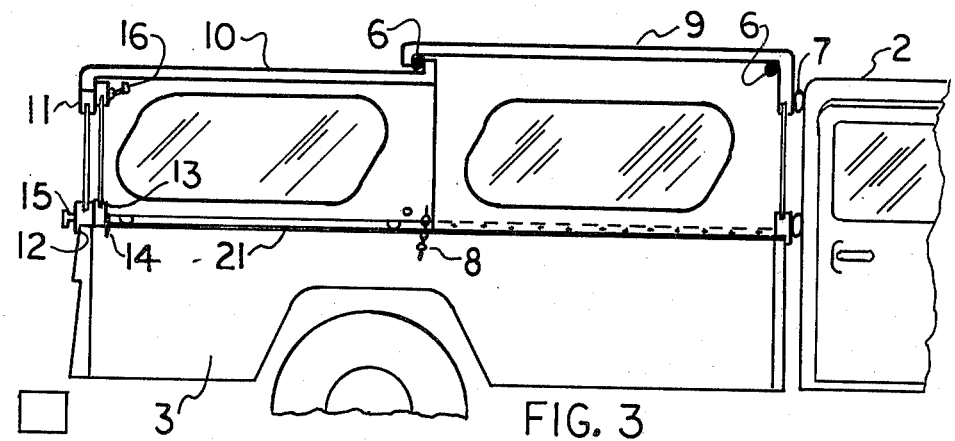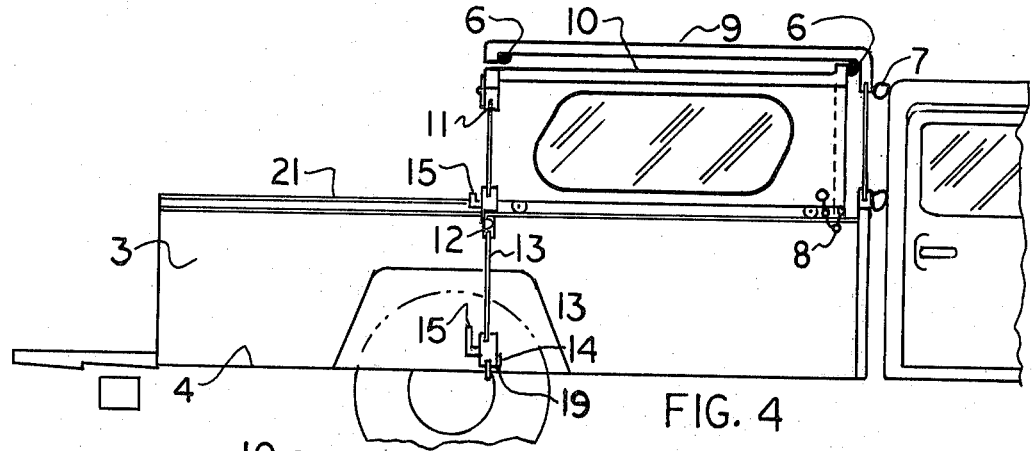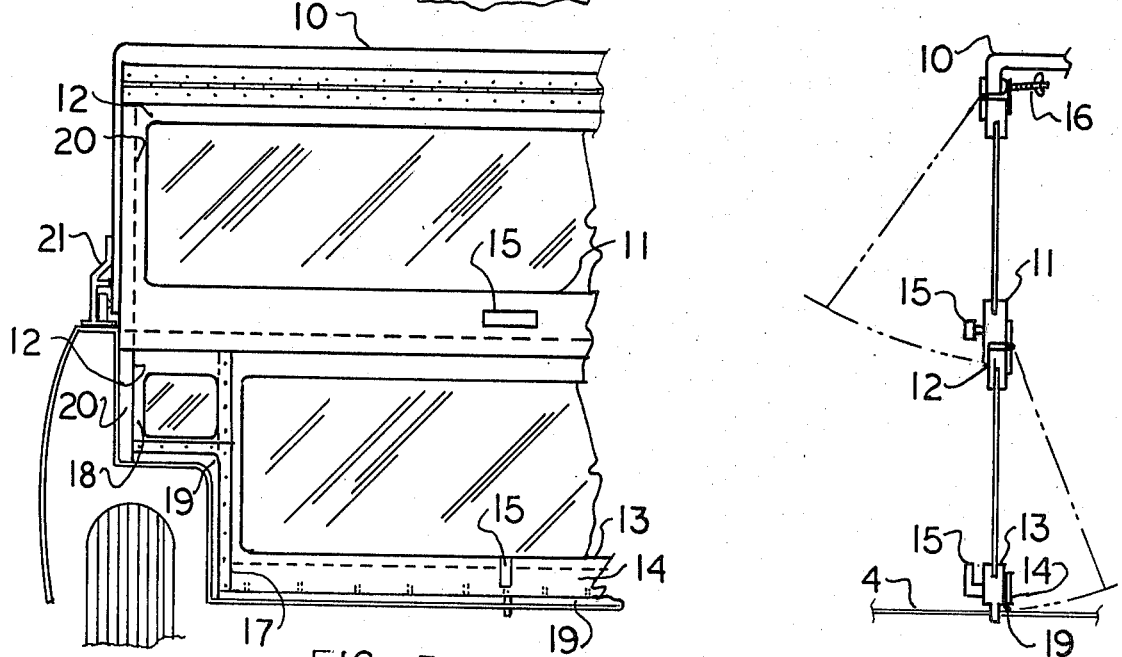

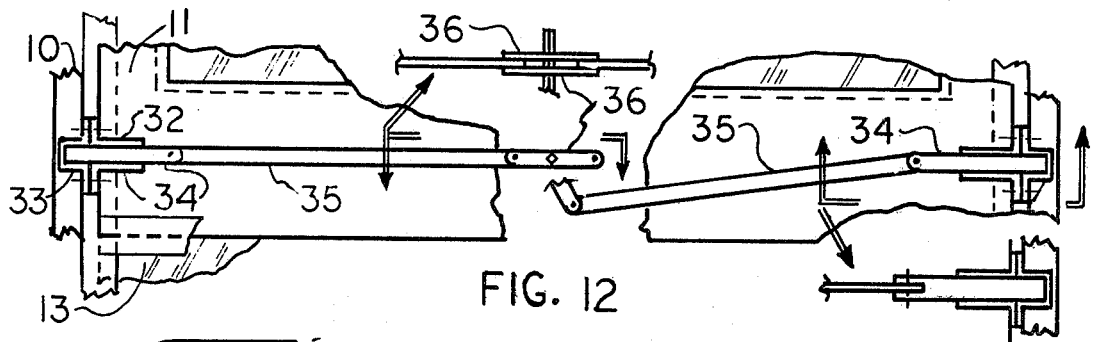
FIG. 12
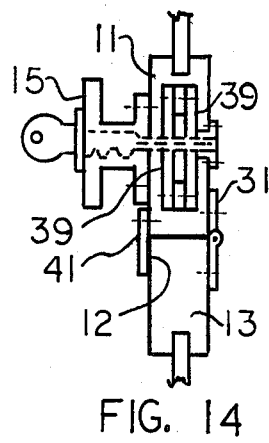
FIG. 13
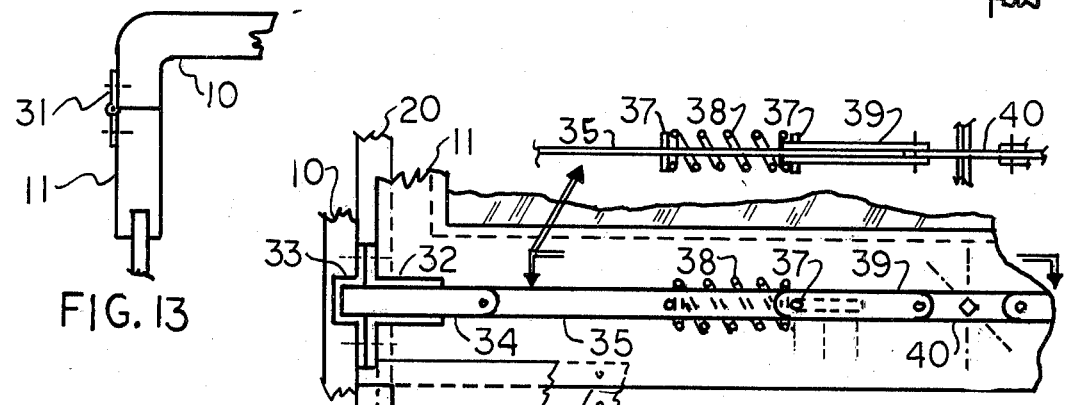
FIG. 16
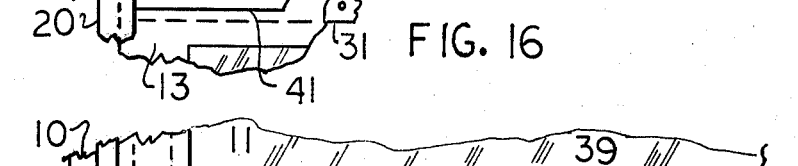
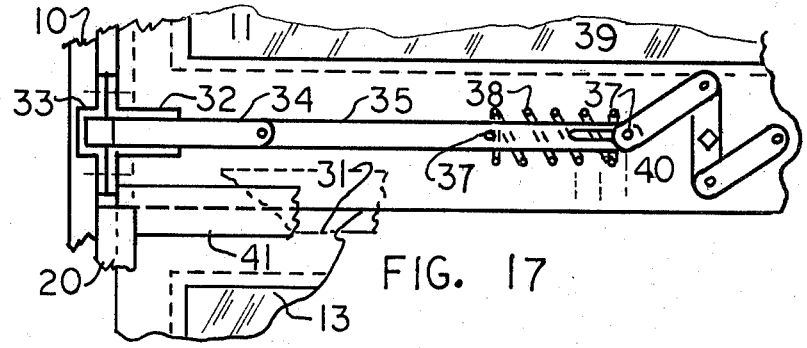
FIG. 17
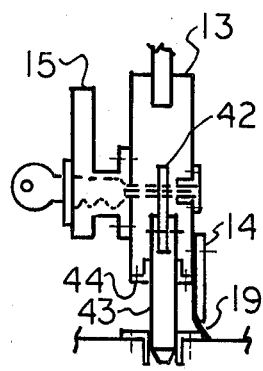
FIG. 15
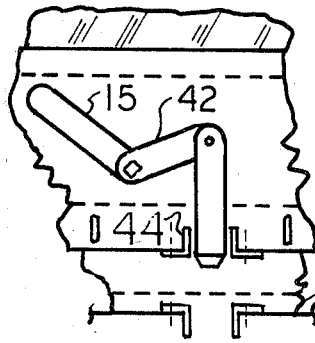
FIG. 18
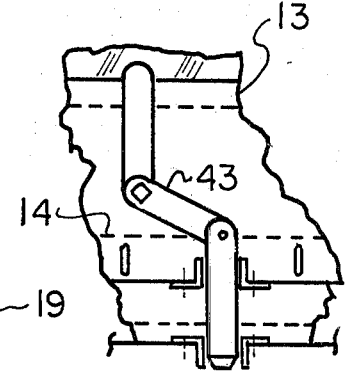
FIG. 19

EXPANDABLE CAMPER BODY

FIELD OF THE INVENTION

This invention pertains to a pick-up truck modified so as to provide an expandable camper body and in particular to a camper body composed of a front unit and a back unit, the back unit being adapted for telescopic movement into the front unit. The front unit constitutes a compartment separate and distinct from the truck's cab and can serve in the unexpanded condition as a half size camper or lockable compartment and the exposed rear flat bed is available for cargo while still serving as a camper or as a dual purpose vehicle.

DESCRIPTION OF THE PRIOR ART

The prior art is replete with examples of expandable camper bodies and house trailers. However, to the best of the inventors' knowledge, none of the prior art devices can be used simultaneously as both a camper and a pick-up truck.

A search of the prior art resulted in the discovery of the following patents:
U.S. Pat. No. 2,457,581, October 1947, McCain
U.S. Pat. No. 2,555,942, June 1951, Supplee
U.S. Pat. No. 2,853,340, September 1958, Hershberger
U.S. Pat. No. 2,971,794, February 1961, Garcia
U.S. Pat. No. 2,995,398, August 1961, Davenport
U.S. Pat. No. 3,124,386, March 1964, Jonas
U.S. Pat. No. 3,463,540, September 1969, Carr
U.S. Pat. No. 3,578,378, April 1969, Anderson
U.S. Pat. No. 3,640,565, February 1970, Anderson
U.S. Pat. No. 3,850,470, November 1974, Trelle
U.S. Pat. No. 4,068,886, October 1976, Gostomski
U.S. Pat. No. 4,133,571, January 1979, Fillios.

Of the above cited patents, the Garcia, Anderson (U.S. Pat. No. 3,640,565), Gostomski and Fillios patents are deemed the most pertinent. The Garcia patent discloses the provision of a compartment in addition to the cab for an additional seat or seats may be expanded to two seats as distinct from a single seat. The inventor provides a pocket in the cab's top for storing the telescopic top portion. The rear window and panel are moved forward and become the back section of the truck's cab. The two sides are removed and stored in two side pockets built into the truck's side panels.

The patent to Anderson (U.S. Pat. No. 3,640,565) discloses a telescopic cover for a pick-up truck as a movable back unit which telescopes into a front unit. A pair of tracks or rails are provided with bumps or indentations to facilitate the telescopic action. A double set of wheels provided for use on the track or rails. No half size camper is taught.

The patent to Gostomski discloses a telescopic cover assembly for a pick-up truck and provides a full length camper. A back-up unit telescopes into the front end unit. Nowhere is there a teaching of a half size camper. The lower portion below the half tail gate is open and not enclosed as a lockable compartment.

The patent to Fillios discloses an expandable camper body. A series of wheels or rollers rides in a pair of recessed rails or guides, the track being foldable and expandable and requires six double acting hydraulic pistons.

SUMMARY OF THE INVENTION

The present invention relates to a conventional pick-up truck with a cab and a truck body together with two separate units fastened to the side rails and the truck's body. The back unit is telescopically movable either forward or backward. When the back unit is fully extended backwardly from the cab, the upper tail gate overlaps the truck's tailgate and provides a full size camper. When the back unit is pushed into or telescoped into the front unit, the upper tail gate is locked to the sides and the lower tail gate is swung down and locked to the truck's flat bed so as to provide a half size camper or lockable compartment. The exposed flat bed rear portion is available for hauling tall or bulky cargo and now serves as a dual purpose vehicle.

BRIEF DESCRIPTION OF THE DRAWINGS

FIG. 3 shows the camper topper fully extended;

FIG. 4 shows the back unit pushed or telescoped into the front unit;

FIG. 5 shows a rear view of the upper and lower tail gates; both end panels of the lower tail gate are shaped to fit the contours of the tire well;

FIG. 6 shows a section through the double tail gate, the upper tail gate being hinged to the camper and swings out, the lower tail gate is hinged to the upper tail gate and swings in and up and is fastened or stored to the upper tail gate with a swing type eye bolt and wing nut;

FIG. 12 shows a method of locking the upper tail gate;

FIG. 13 shows the upper tail gate hinged to the back unit;

FIG. 14 shows a section through the bottom rail and top rail of the tail gate, a section of the locking mechanism and the top rail of the lower tail gate hinged to the upper tail gate;

FIG. 15 shows the bottom of the lower tail gate in locked position to the truck's flat bed and with the handle in a vertical position;

FIG. 16 shows a spring activated locking device in locked position with the lock handle in a horizontal position, the pin pushes the slot in the flat bar and pushes the flat bar for engaging the lock bolt;

FIG. 17 shows the spring activated locking device in unlocked position with the pin unlocked but slammed closed as a car door;

FIG. 18 shows the lower tail gate in unlocked position; and

FIG. 19 shows the lower tail gate in locked position.

DESCRIPTION OF THE PREFERRED EMBODIMENT

Figure 1:
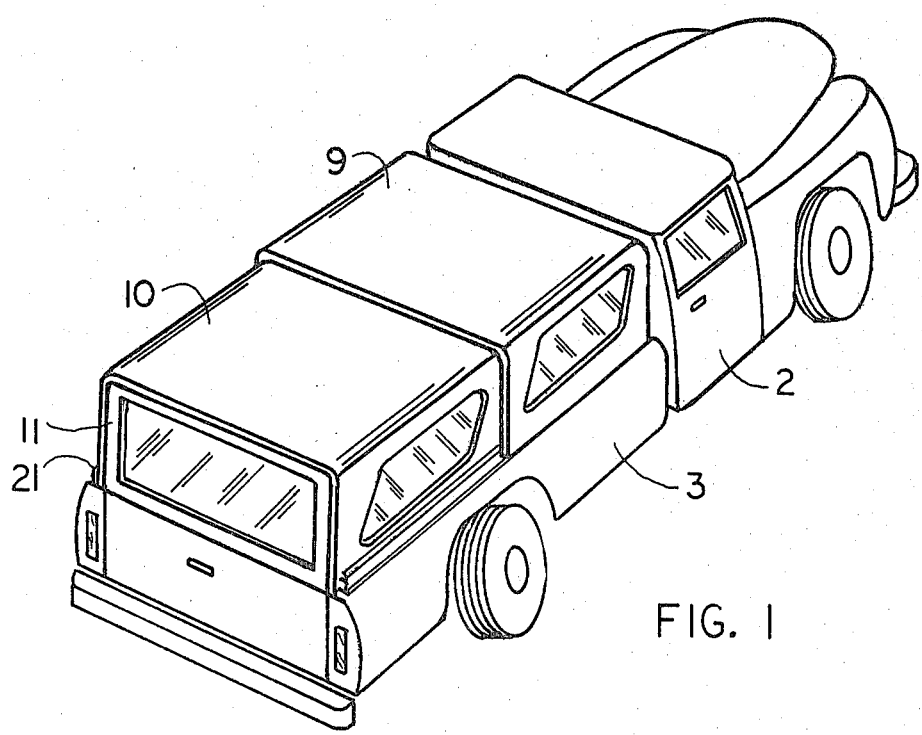
FIG. 1 is a perspective view of the inventor's camper fully extended.

Referring now to the drawings, FIG. 1 shows the pick-up truck with the expando camper fully extended (1) the pick-up truck's cap (2), the side panels (3) and the tail gate (5), the back unit (10), the upper tail gate (11), the lock and the handle (15) with the rail or track (21) on each side.

Figure 2:
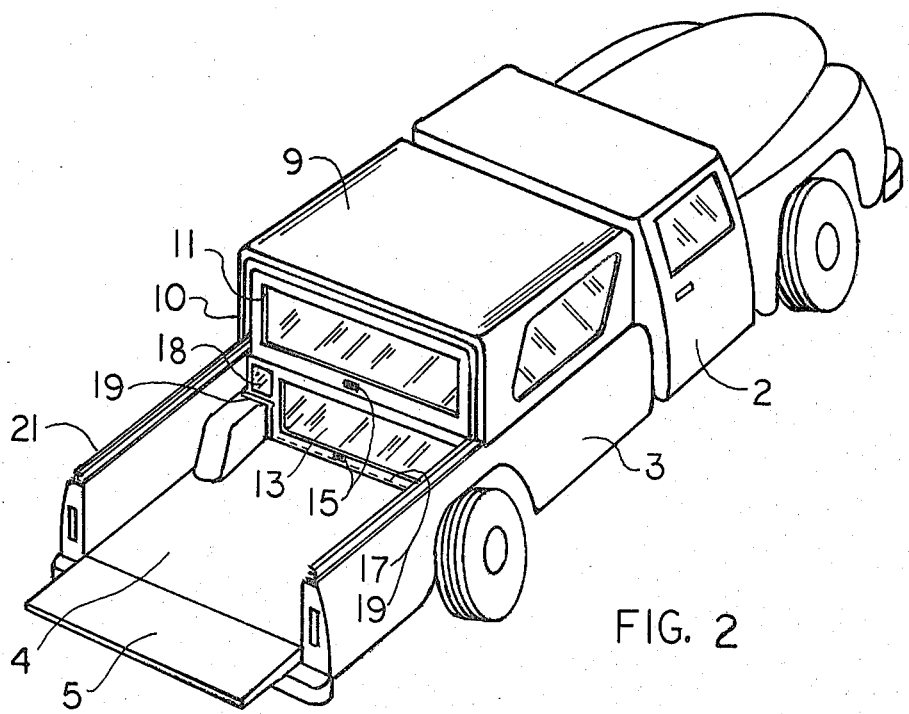
FIG. 2 shows the back unit pushed or telescoped into the front unit. The exposed rear portion of the flat bed of the truck is available for hauling tall or bulky cargo.

In FIG. 2, the back unit (10) is shown telescoped or pushed into the front unit (9) which is permanently fastened to the track (21) which in turn is fastened to the truck. The upper tail gate (11) has a lock and handle (15) and locks into each handle (15) and locks into each side panel. The bottom half tail gate with lock and handle locks to the truck's flat bed (4). The back portion of the flat bed is now available for tall or bulky cargo. The lower tail gate (13) may be swung up, inside of the upper tail gate and fastened, thus enabling the hauling of 4'×8' sheets of plywood, sheetrock, 2×4 and other types of building materials, tools and hardware.

FIG. 3 is a section through the center line of the camper topper fully extended, the front unit shows a flexible rubber gasket with an air tight seal between the windows.

In FIG. 4 the back unit (10) is pushed or telescoped into the front unit (9). The lower half tail gate (13) is swung down and securely locked to the truck's flat bed (4) and the back unit (10) is locked to the front with the securing pin (8). The rails (21) are fastened to the truck's side panels. Rubber gaskets (12) and (19) seal against the weather and prevent marring of the truck's body.

FIG. 5 shows a rear view of the double tail gate and locks and handles. The slotted closure bar (14) compensates for variations in the heights of different side panels. The side wing is cut to fit the tire well contour and fits into grooves on each end and is fastened to tail gate stops with gaskets (20) and tracks or rails (21).

FIG. 6 shows a section through the tail gate, the upper tail gate being hinged to the back unit (10). The lock and handle (15) activate the lock bolts into the side panels (3). The bottom half of tail gate (13) is hinged to the bottom rail (21). Lock and handle (15) activate the lock bolt into the bottom of the flat bed (4). A slotted closure bar (14) with a rubber or other similar resilient composite gasket (19) is fastened on the bottom rail (21). The swinging eye bolt and wing nut (16) hold the lower tail gate in the stored position.

Figure 7:
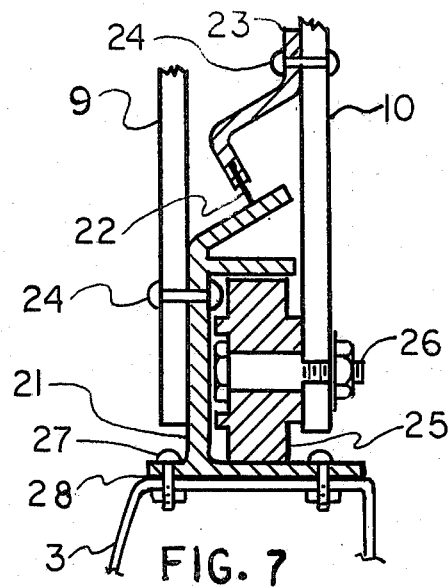
FIG. 7 shows a sectional view of the side panel, track, the front unit and the method of fastening and the back unit with rollers telescoped into the front unit and the weather seal.

FIG. 7 shows a partial section of the back unit (10) telescoped into the front unit (9) which is fastened. The track (21) and gasket (28) are fastened to the truck's side panel (3) with fastener (27). Four wheels (25) are attached to the back unit (10) with four shoulder bolts (26). Weather stripping (22) is attached and fastened with fastener (24).

Figure 8:
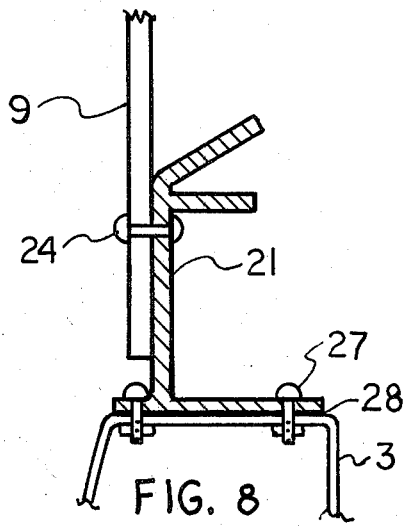
FIG. 8 shows the back unit fastened to the track.

FIG. 8 shows a sectional view of the tracks or rails (21), and gasket (28) is fastened to the top of the truck's side panel (3). The front unit (9) is permanently fastened by fastener (24).

Figure 9:
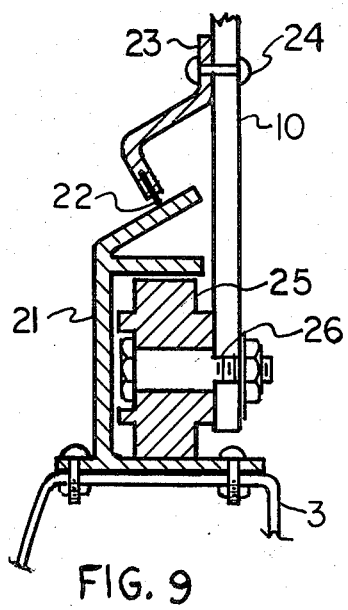
FIG. 9 shows a section through the back unit tracks, roller and weather seal.

FIG. 9 shows a sectional view of back unit (10). The wheels or rollers (25), (two on each side) are fastened to the unit with shoulder bolts and nuts (26). The wheels roll between two flanges of track (21). The upper flange acts as a retainer, preventing lift up of the unit and a top flange to accommodate weather stripping (22). The retainer (23) is shaped and fastened.

Figure 10:
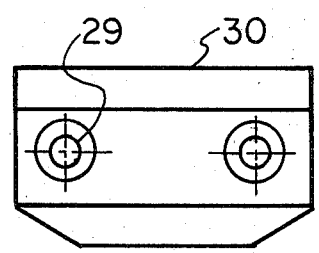
FIG. 10 shows an elevation of the beveled block of metal, TEFLON, nylon or of similar material.
Figure 11:
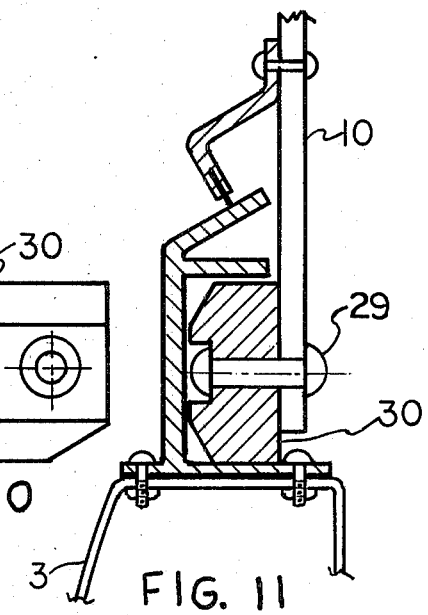
FIG. 11 shows a sectional view of the beveled block, the back unit weather seal and the track or rails.

FIGS. 10 and 11 show as an alternate to rollers or wheels, four beveled sliding blocks (30) of teflon, nylon or similar material permanently fastened to the back unit (10) with standard fasteners (29).

FIG. 12 shows a mechanical locking device for the upper half tail gate (11). Lock bolt (34) has a slot at one end to receive flat bar (35). A double pivot flat bar (36) has a square hole or slot for the shaft of handle (15).

FIG. 13 shows the top rail of the upper tail gate (11) fastened to back unit (10) by hinge (31).

FIG. 14 shows a section through the bottom rail of upper tail gate (11) with locking handle (15). Single pivot flat bar (40) is provided with a square hole or slot as desired. Flat bar (41) overlaps the truck's tail gate (5) and the top rail of lower tail gate (13) in turn is hinged to lower rail (21). A gasket (12) prevents damages or scratches and is also a seal against the elements.

FIG. 15 shows the lower tail gate (13) with rubberized gasket (19) attached at the bottom. Flat bar (14) is adjustable by means of slotted holes to allow for variation in height of side panels.

FIG. 16 shows the lower rail of the upper tail gate (11) with a spring activated locking device. The lock bolt (34) is slotted to receive flat bar (36) and pin (37) serves as a stop for spring (38). Flat bar (36) has an oblong slot and a pin (37) fits in the slot and holds the two connecting arms (39,39) in position.

A single pivot bar (30) has a square hole or slot to accommodate the shaft of lockable handle (15). When the handle is horizontal the pin (37) pushes against the slot end and the flat bar pushes the lock bolt (34) into flanged slot (33) to locked position.

FIG. 17 is similar to FIG. 16 except shown in unlocked position with the handle in vertical position and the pivot bar in vertical position pulls the two connecting arms (39) (39) to the inner edge of the slot which in turn pulls flat bar (36) and lock bolt (34) out of the flanged socket. When handle (15) is in a slant or angled position, pin (37) and the two connecting arms permit the tail gate (11) to be slammed closed.

FIG. 18 shows the same parts as in FIG. 15 in unlocked position. When the lockable handle (15) is at an angle pivot bar (42) pulls lock bolt (43) out of the flanged socket (45) which is fastened to the truck's flat bed.

FIG. 19 shows the same parts as in FIGS. 15 and 18 in locked position.

In summary, the expandable camper body is designed to provide a pick-up truck with an expandable camper body which permits the truck to be used both as a pick-up truck and as a camper when the expandable camper body is in telescoped and unexpanded position and as a camper only when the camper body is in fully expanded position. So far as is known, we are the first to this combined use simultaneously of both the pick-up truck and camper body. Our camper body is adapted for use with a standard pick-up truck requiring merely that the camper be bolted to the flat bed of the pick-up truck. The simplified track or rail provides for mechanical simplicity and structural rigidity in a cost-effective embodiment. The design enables the camper body to be utilized whether extended or retracted.

While the preferred embodiment has been discussed in detail, various modes of carrying out the invention are contemplated as being within the scope of the following claims, particularly pointing out and distinctly claiming the subject matter which is regarded as the invention. This invention is to be limited only by the scope of the appended claims.

What is claimed is:

1. In a vehicle having a cab and a flat bed truck body a unitary expandable camper body structure for use as a camper and comprising a front unit and a back unit, the front unit being permanently secured to the flat bed of the truck and the back unit being adapted for telescoping into and out of the front unit so as to provide for use both as a pick-up truck and as a camper either simultaneously or alternatively, the front end being completely enclosed when in unexpanded condition and the back unit being fully enclosed in the expanded condition, furthermore the back unit has an upper half tailgate and a lower half tailgate so as to provide a completely sealed compartment in either expanded or collapsed position.

2. The expandable camper body structure of claim 1 wherein rails are provided on side panels of the truck for guiding the back unit into expanded condition.

3. The expandable camper body of claim 2 wherein rollers are fastened to the back unit for rolling between flanges of the rails.

4. The expandable camper body of claim 2 wherein beveled sliding blocks permit sliding of the back unit.

5. The expandable camper body structure of claim 1 wherein the back unit serves as a lockable storage compartment.

6. The expandable camper body structure of claim 1 wherein the back unit telescopes into the front unit with the upper tailgate locked to the sides and the lower tailgate swung down and locked to the truck's flat bed, a lockable half-sized camper results.

7. The expandable camper body structure of claim 1 wherein the back unit is fully extended and the upper tailgate overlaps the truck's gate whereby a full sized camper results.

8. The expandable camper body structure of claim 2 wherein bevel blocks serve as guides for the back unit over the rails from or into expanded condition.

9. The expandable camper body structure of claim 2 wherein wheels serve as guides for the back unit over the rails from or into expanded condition.

* * * * *